United States Patent
Johnson, Sr. et al.

(10) Patent No.: US 10,571,211 B2
(45) Date of Patent: Feb. 25, 2020

(54) RECOIL MANAGEMENT SYSTEM

(71) Applicant: Really Right Stuff, LLC, San Luis Obispo, CA (US)

(72) Inventors: Joseph M. Johnson, Sr., San Luis Obispo, CA (US); Joseph M. Johnson, Jr., San Luis Obispo, CA (US); Brandon Bray, San Luis Obispo, CA (US)

(73) Assignee: Really Right Stuff, LLC, Lehi, UT (US)

( * ) Notice: Subject to any disclaimer, the term of this patent is extended or adjusted under 35 U.S.C. 154(b) by 0 days.

(21) Appl. No.: 16/052,012

(22) Filed: Aug. 1, 2018

(65) Prior Publication Data
US 2019/0078853 A1 Mar. 14, 2019

Related U.S. Application Data

(60) Provisional application No. 62/558,196, filed on Sep. 13, 2017.

(51) Int. Cl.
| *F41A 25/14* | (2006.01) |
| *F41A 23/00* | (2006.01) |
| *F41A 23/14* | (2006.01) |
| *F16M 11/04* | (2006.01) |

(52) U.S. Cl.
CPC ............ *F41A 25/14* (2013.01); *F41A 23/005* (2013.01); *F41A 23/14* (2013.01); *F16M 11/041* (2013.01)

(58) Field of Classification Search
CPC ........ F41A 23/16; F41A 23/12; F41G 11/002; F41G 11/004
See application file for complete search history.

(56) References Cited

U.S. PATENT DOCUMENTS

| | | | |
|---|---|---|---|
| 5,347,740 A | 9/1994 | Rather et al. | |
| 5,913,668 A | 6/1999 | Messer | |
| 6,272,785 B1 | 8/2001 | Mika et al. | |
| 6,574,899 B1 | 6/2003 | Mostello | |
| 6,773,172 B1 | 8/2004 | Johnson et al. | |
| 7,313,884 B2 | 1/2008 | Eddins | |
| 7,823,318 B2 | 11/2010 | Hall | |
| 8,006,426 B1 * | 8/2011 | Carroll | F41A 23/14 42/94 |
| 8,398,037 B2 | 3/2013 | Johnson et al. | |
| 8,549,786 B1 | 10/2013 | Griffith | |
| 9,021,728 B1 * | 5/2015 | Kocmich, IV | F41A 23/04 248/562 |
| 10,113,827 B2 * | 10/2018 | Elsner | F41A 23/10 |
| 2006/0175482 A1 | 8/2006 | Johnson | |
| 2010/0170128 A1 * | 7/2010 | Werner | F41A 23/16 42/1.06 |

\* cited by examiner

*Primary Examiner* — J. Woodrow Eldred
(74) *Attorney, Agent, or Firm* — Chernoff, Vilhauer, McClung & Stenzel, LLP

(57) ABSTRACT

A recoil management system.

23 Claims, 23 Drawing Sheets

RECOIL MANAGEMENT SYSTEM

CROSS-REFERENCE TO RELATED APPLICATIONS

This application claims the benefit of U.S. Provisional Application No. 62/558,196 filed Sep. 13, 2017 entitled Recoil Management System.

BACKGROUND OF THE INVENTION

The present invention relates to recoil management systems. More specifically, recoil management systems that work in conjunction with commonly available tripods, for example, those utilized with cameras.

The traditional manner of achieving maximum accuracy in rifle shooting requires a shooter to be prone, lying on the ground, or requires the rifle to be rigidly supported on a bench support. However, the prone position is often obstructed by obstacles (such as tall grass, fallen trees, low walls, and even rises and falls in geography) and a bench support is rarely available while hunting, in mobile shooting competitions, or on a battlefield.

The stability with which a rifle may be maintained is important to the accuracy with which it can be fired. Conversely, the ease of transporting a rifle and ancillary equipment, as well as the speed with which it can be brought to bear, can be important to success during hunting. Often these considerations are at odds with one another, with stability being obtained by burdensome and complicated equipment, and with ease of transporting a rifle and ancillary equipment being obtained with equipment that compromises stability.

Equipment suitable for fully unsupported shooting positions typically rely on bone support rather than muscle support for the rifle to reduce fatigue and movement of the rifle during shooting. Often the unsupported shooting positions will include a sling to reduce strain on the bicep of the supporting arm to further stabilize the rifle shooting position. While shooting with an unsupported position requires little more than a rifle for transport and can assume a shooting position quickly, there are substantial limits to the stability with which the rifle may be held, even when using a sling to stabilize and support the shooting arm.

Equipment suitable for fully supported shooting positions typically rely on a rifle rest, such as those available at commercial shooting ranges, that not only completely support the rifle, but also substantially reduce the felt recoil. While suitable for a commercial shooting range, such rifle rests are unworkable in a hunting situation because they are intended to be utilized with shooting benches. Moreover, the rifle rests often rely to a large extent on weight to reduce the felt recoil, making their transportation during hunting impractical.

U.S. Pat. No. 6,574,899 discloses a tripod mounted combined gun rest and arm rest. The gun rest includes a platform adapted to be mounted on a tripod. The platform includes a forward gun cradle and a rear gun cradle, each of which is mounted in an adjustment slot disposed within the platform. The tripod is a conventional photographic tripod. The forward gun cradle and the rear gun cradle can be adjusted so that the center of gravity of the gun is centered over the tripod. The platform with cradles tends to be relatively complicated, and the rifle recoil tends to result in disrupting the position of the tripod making repeated shooting burdensome because the tripod needs to be readjusted.

U.S. Pat. No. 6,272,785 discloses a gun holder device that includes a gun support device with a body that defines a channel therein, with the channel being structured to resist lateral motion of the gun. The gun support device is structured to be mounted on a tripod, which may be a conventional tripod that is typically used in photography. In addition to being burdensome to carry, the rifle recoil tends to result in disrupting the position of the tripod making repeated shooting burdensome because the tripod needs to be readjusted.

U.S. Pat. No. 5,347,740 discloses a combination camera mount and gun mount. The gun mount includes mounting units for holding a rifle, attached at either end of the mounting beam. The mounting beam is pivotally attached to a cylindrical post, which is held in place by the mounting unit. A camera mount may be attached to the mounting beam. The rifle recoil tends to result in disrupting the position of the tripod making repeated shooting burdensome because the tripod needs to be readjusted.

U.S. Pat. No. 5,913,668 discloses a weapon rest having a base in the form of a tripod supporting a shaft. A cradle is pivotally secured to the top of the shaft. A swivel head at the top of the shaft permits horizontal rotation of the cradle, while the pivot pin permits vertical rotation of the cradle. A spring is connected between the shaft and cradle to provide tension, which is claimed to enhance accuracy. The rifle recoil tends to result in disrupting the position of the tripod making repeated shooting burdensome because the tripod needs to be readjusted.

U.S. Pat. No. 7,313,884 discloses a recoil suppressing gun support. The gun support includes a base member that is structured to mount on the window sill of a hunting shelter. A barrel support is mounted on one end of the base. A cradle is mounted on the opposite end of the base. A mounting plate is attached to the bottom surface of the base by a bolt, in a manner that permits rotation of the base relative to the mounting plate.

U.S. Pat. No. 7,823,318 discloses a rifle recoil absorption system. The recoil absorption system includes a harness having a large loop of webbing material extending along both sides of the fore stock and stock of the rifle, wrapping around the butt. Smaller loops extending around the shoulder stock and fore stock, respectively, hold the loop in place. An attachment strap is secured to the loop of the rifle harness. The attachment strap passes underneath a table, and attaches to the back end of the table by utilizing a U-shaped clamp.

U.S. Pat. No. 8,549,786 discloses another rifle recoil absorption system.

Recoil reduction structures that are inherently limited to being used in a static location such as a shooting bench are not suitable for being used in mobile locations, such as on a hunting trip. Recoil reduction structures that are complicated to assemble are likewise not especially suitable for being used in mobile locations, especially when speed is desirable for the rifle to be brought to bear, which can be important to success during hunting. Furthermore, recoil reduction structures that are suitable to be supported by a tripod, tend to often result in the tripod being substantially moved during firing resulting in requiring substantial realignment for the next firing.

Accordingly, it is desirable for a recoil reduction structure suitable for being used in mobile locations which are not complicated to assemble, and then when used on a tripod do not tend to result in the tripod being substantially moved during firing to reduce the need for realignment for the next firing.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

Figure 1:
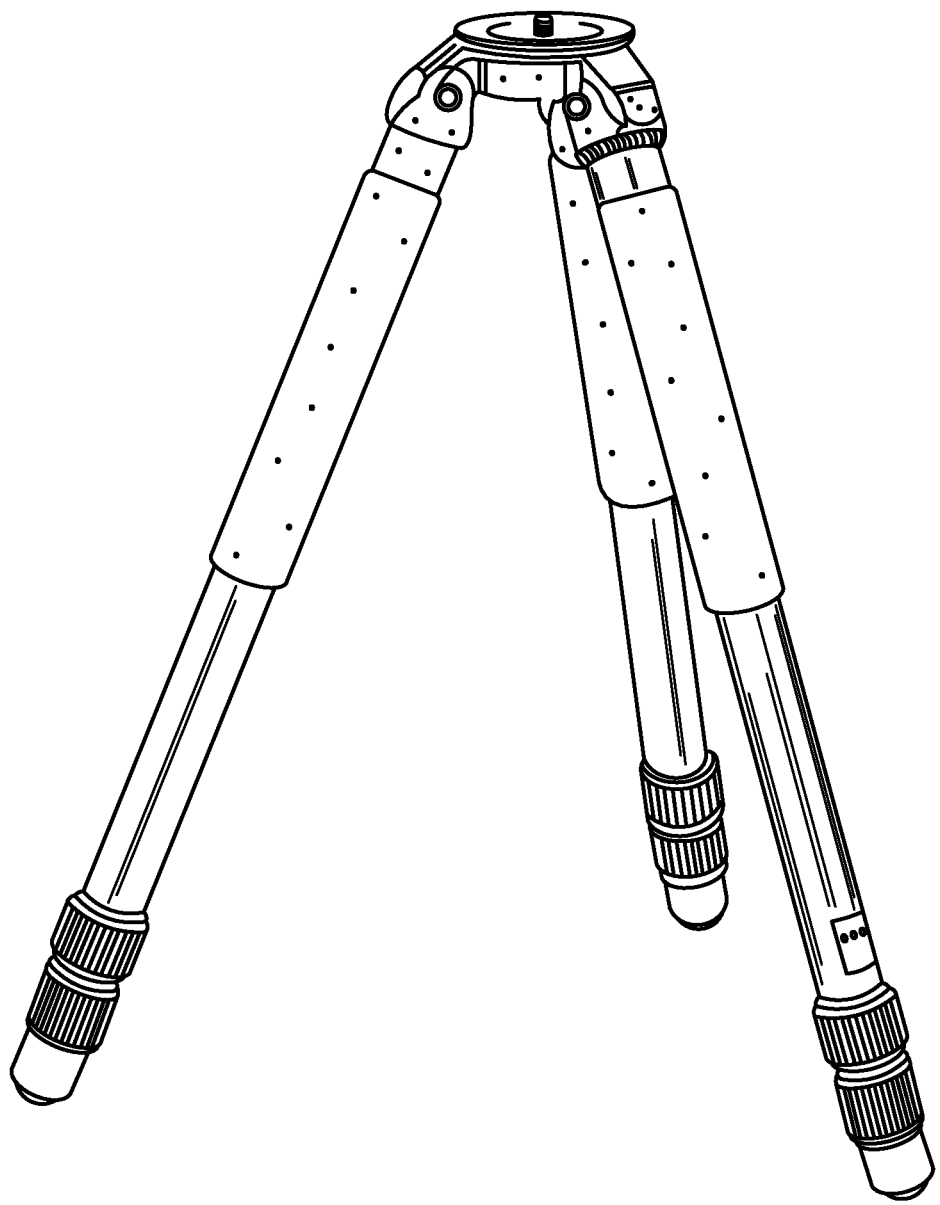
FIG. 1 illustrates a tripod.

Referring to FIG. 1, in many situations it is desirable to have a stable, yet portable, support to permit a shooter to reliably take long and extreme long distance shots (e.g., even beyond 1,000 yards). In many cases, it is desirable that the support is suitable for positioning a rifle of a shooter over two feet or more from the ground, preferably over three feet or more from the ground, and preferably at a height consistent with a standing position of the shooter from the ground. By positioning the support at an elevated height, the shooter is able to shoot over most obstacles without meaningfully compromising the stability of the system or otherwise meaningfully diminishing accuracy. One suitable type of support is a tripod that includes three legs, each of which may be moved inward and outward along an arc from an upper central region. In addition, each of the legs has an adjustable length so that the upper region may be leveled or otherwise oriented in any desired orientation. In addition, the upper region typically includes a threaded member, or otherwise, suitable to be attached to the base of an imaging device or a ball head. An exemplary tripod is illustrated in U.S. Pat. No. 8,398,037, incorporated by reference herein in its entirety.

Figure 2:
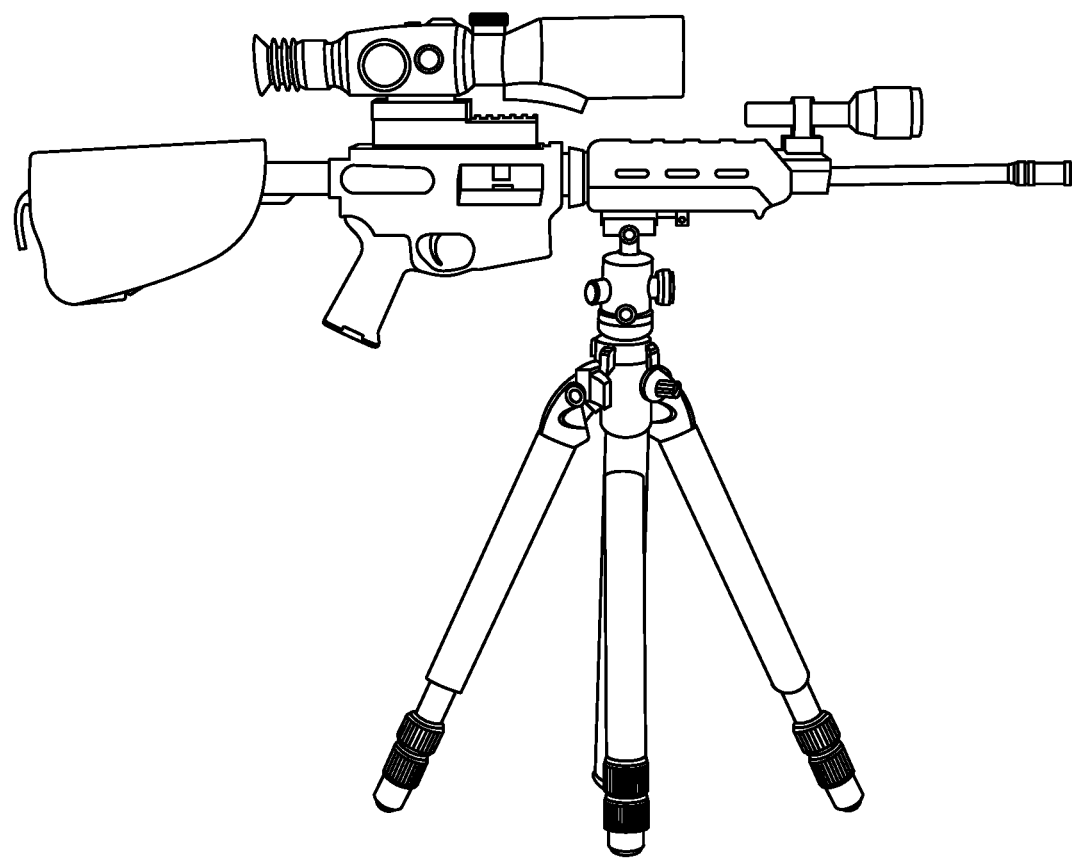
FIG. 2 illustrates a rifle supported by a tripod.

Referring to FIG. 2, with a relatively light support, such as a tripod primarily constructed from carbon fiber materials, the recoil energy from firing a shot with a rifle supported directly thereon in some fixed manner, such that the rifle is rigidly interconnected to the upper region of the tripod, has a tendency to tip the tripod off the ground. After the tripod is tipped off the ground, it does not often land exactly where it was before firing the shot. As a result the shooter can't easily see the impact of his shot, and the shooter needs to reacquire the target before making any follow up shots. This limitation tends to become even more pronounced for inexperienced shooters and with increasingly larger caliber rifles.

Figure 3:
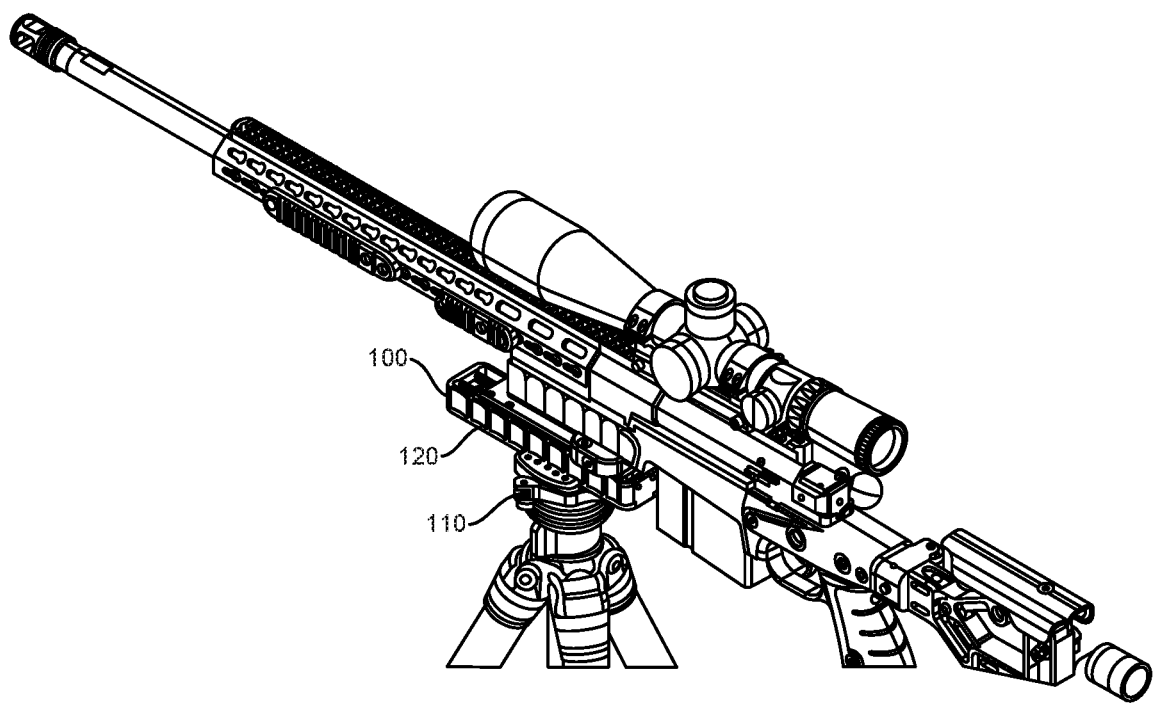
FIG. 3 illustrates a tripod, a rifle, an auxiliary plate, and a recoil reduction structure.
Figure 4:
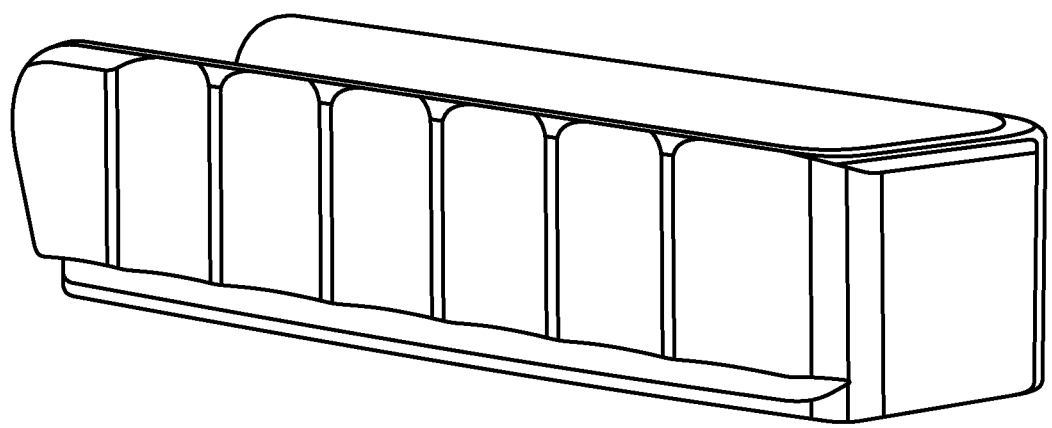
FIG. 4 is a perspective view of an embodiment of the auxiliary plate of FIG. 3.
Figure 5:
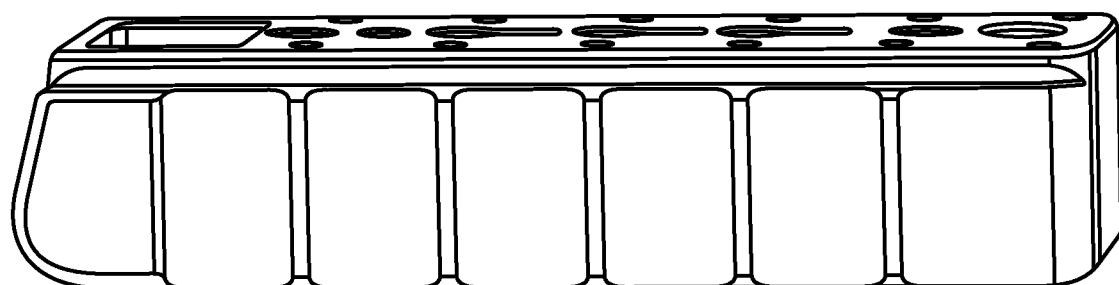
FIG. 5 is a side view of an embodiment of the auxiliary plate of FIG. 3.
Figure 6:
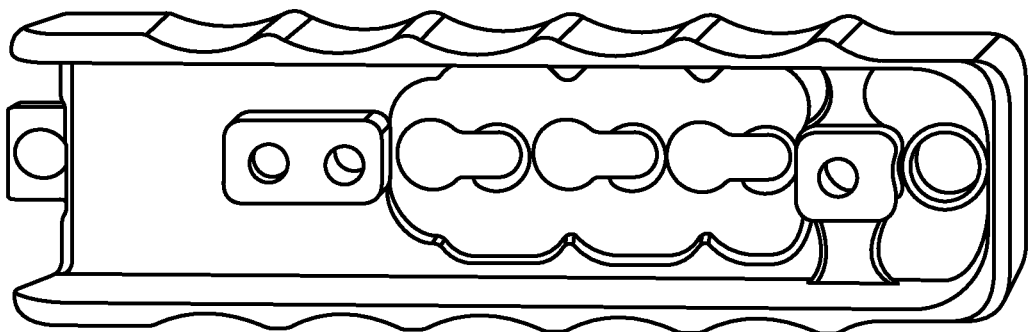
FIG. 6 is a top view of an embodiment of the auxiliary plate of FIG. 3.
Figure 7:
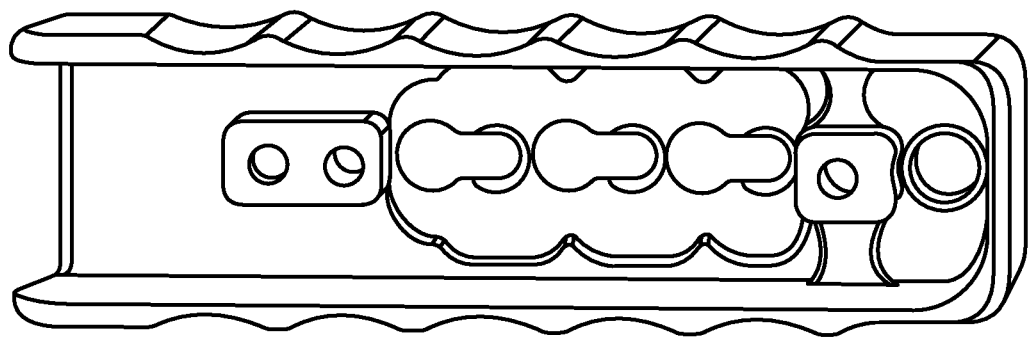
FIG. 7 is a top view of an embodiment of the auxiliary plate of FIG. 3.
Figure 8:
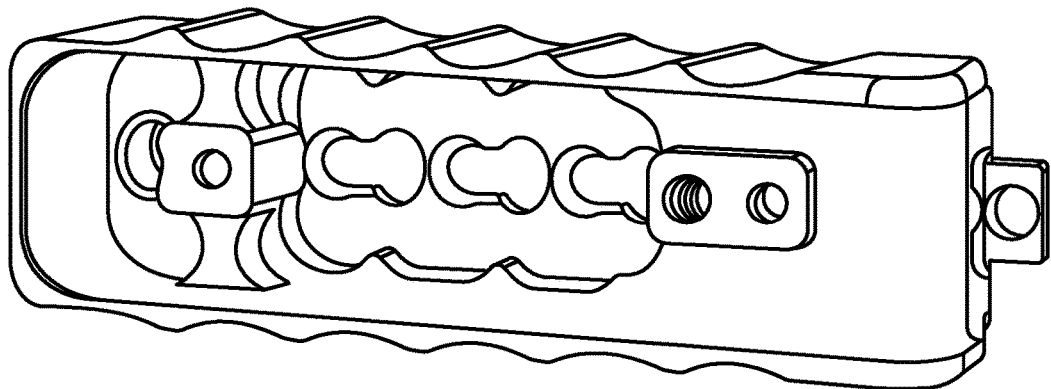
FIG. 8 is a top view of an embodiment of the auxiliary plate of FIG. 3.
Figure 9:
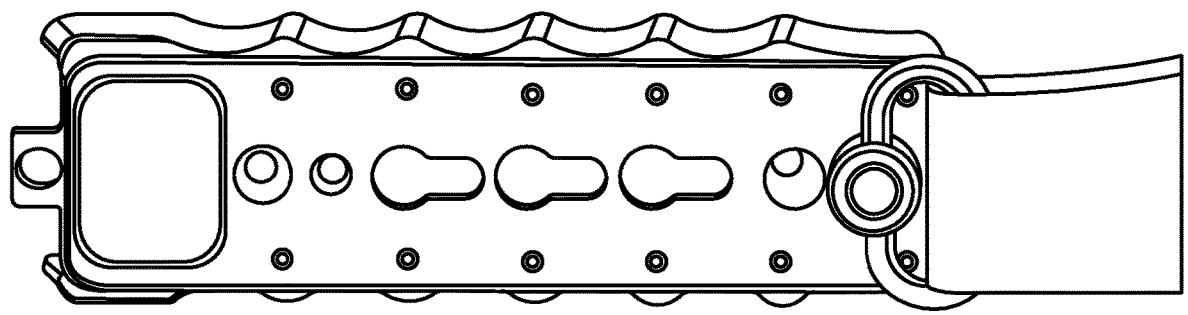
FIG. 9 is a bottom view of an embodiment of the auxiliary plate of FIG. 3.
Figure 10:
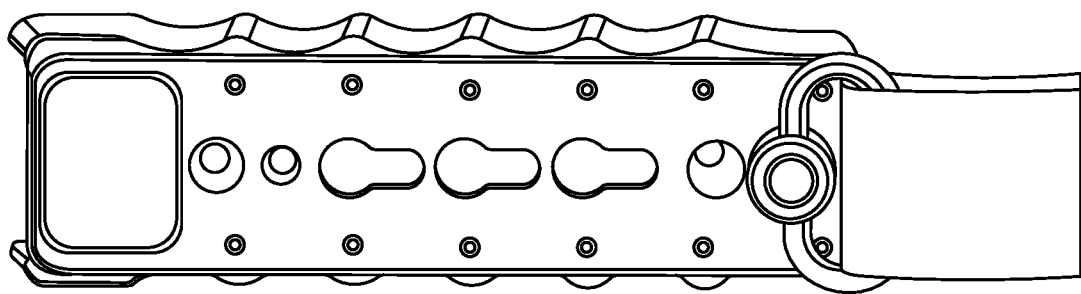
FIG. 10 is a bottom view of an embodiment of the auxiliary plate of FIG. 3.
Figure 11:
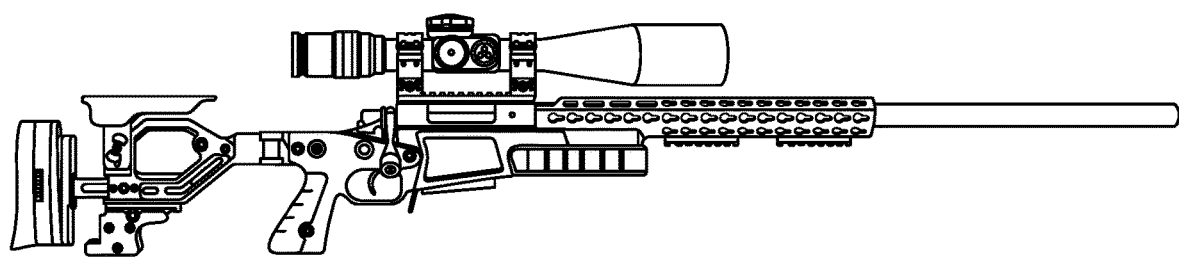
FIG. 11 is a side view of an embodiment of the auxiliary plate of FIG. 3 with a rifle.
Figure 12:
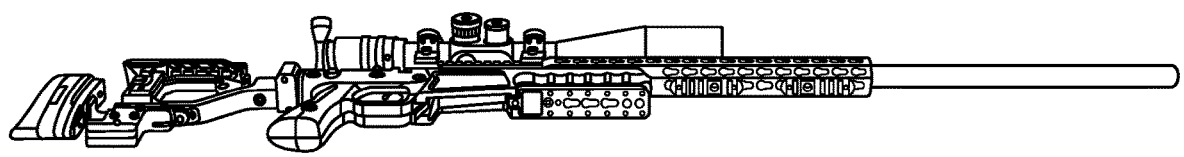
FIG. 12 is a bottom view of an embodiment of the auxiliary plate of FIG. 3 with a rifle.
Figure 13:
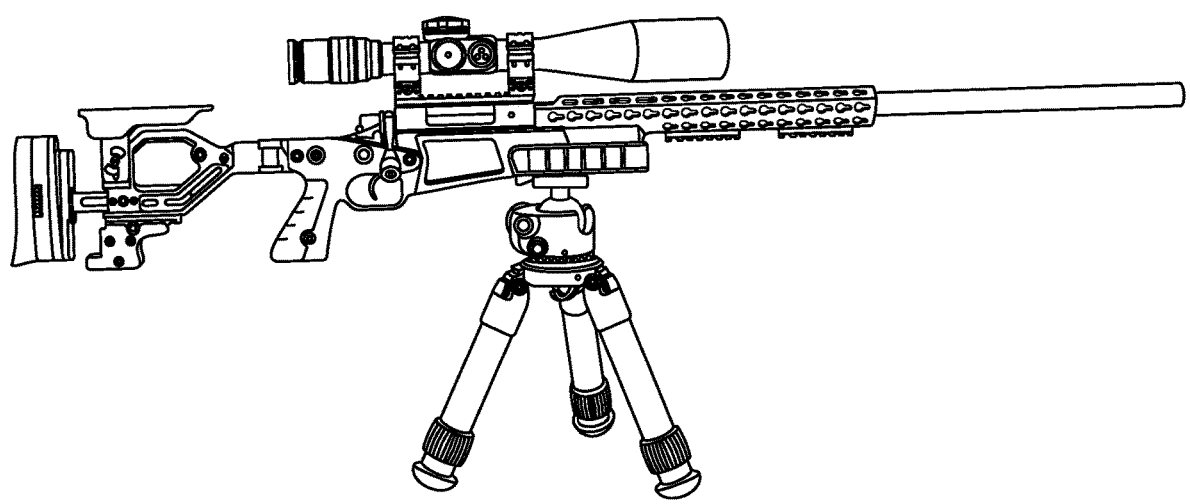
FIG. 13 is a side view of an embodiment of the auxiliary plate of FIG. 3 with a rifle and tripod.
Figure 14:
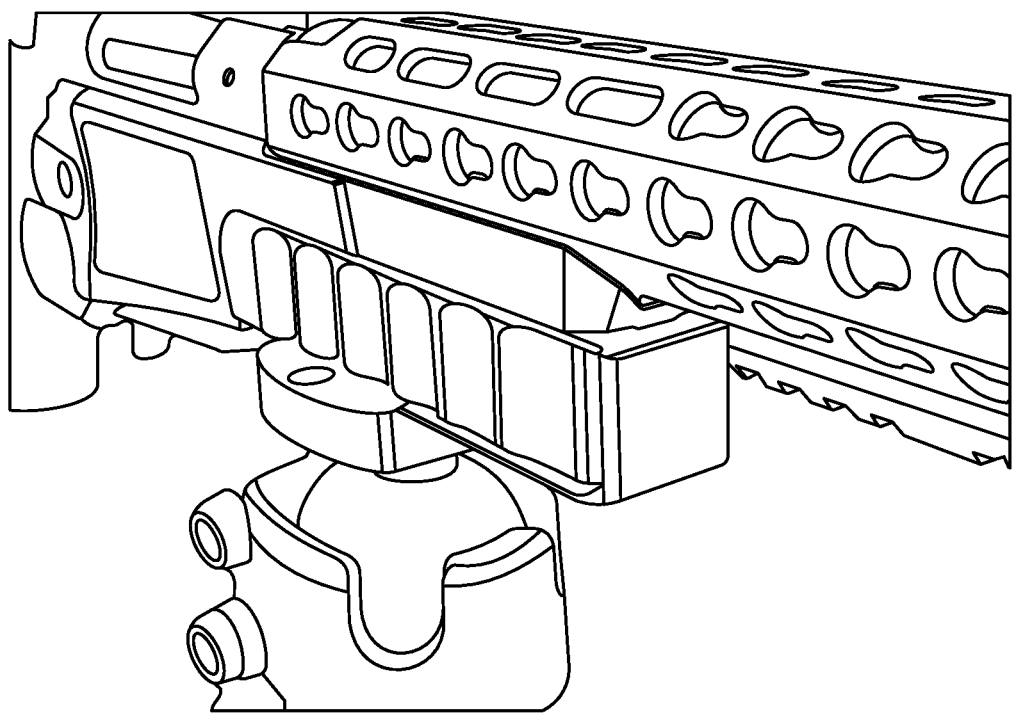
FIG. 14 is a perspective view of an embodiment of the auxiliary plate of FIG. 3 with a rifle and tripod.
Figure 15:
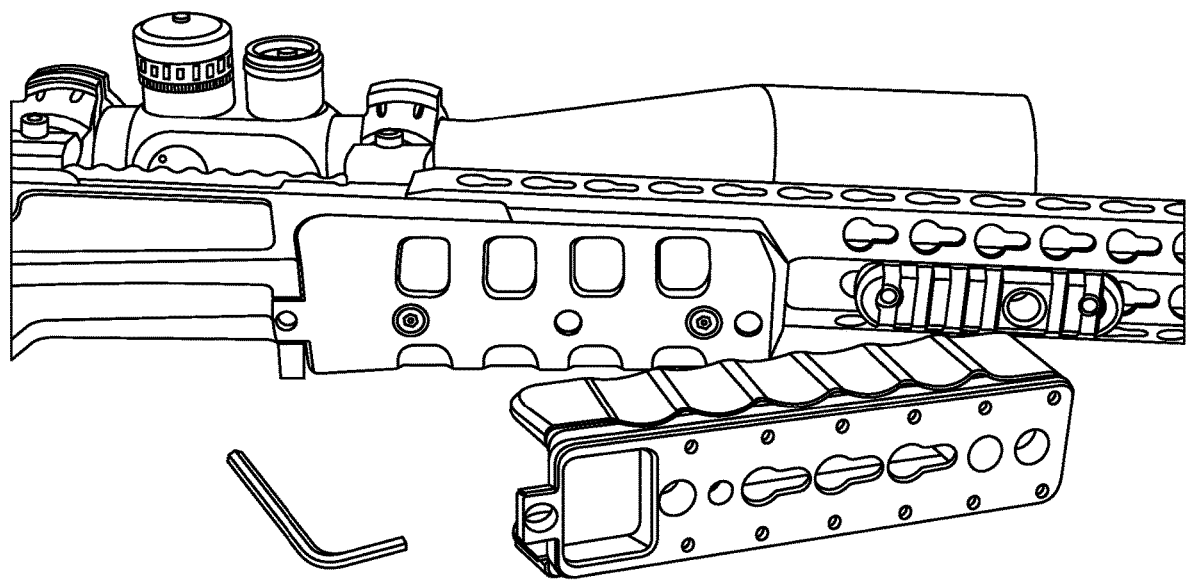
FIG. 15 is a bottom view of an embodiment of the auxiliary plate of FIG. 3 with a rifle.
Figure 16:
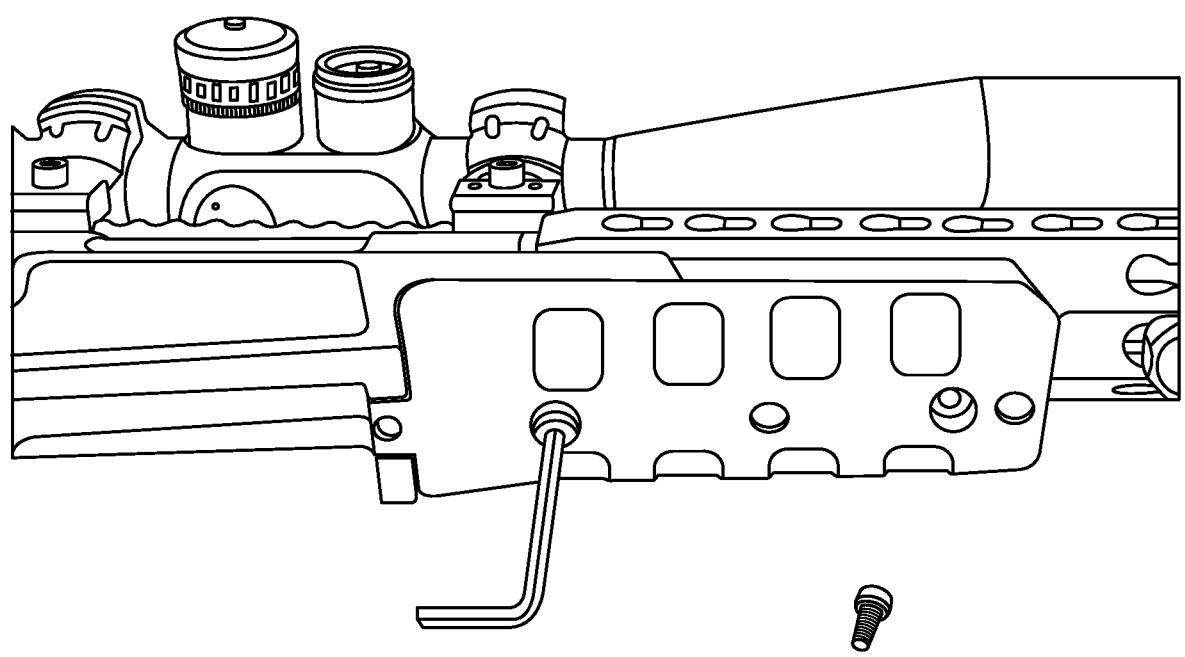
FIG. 16 is a bottom view of a rifle with a grip.
Figure 17:
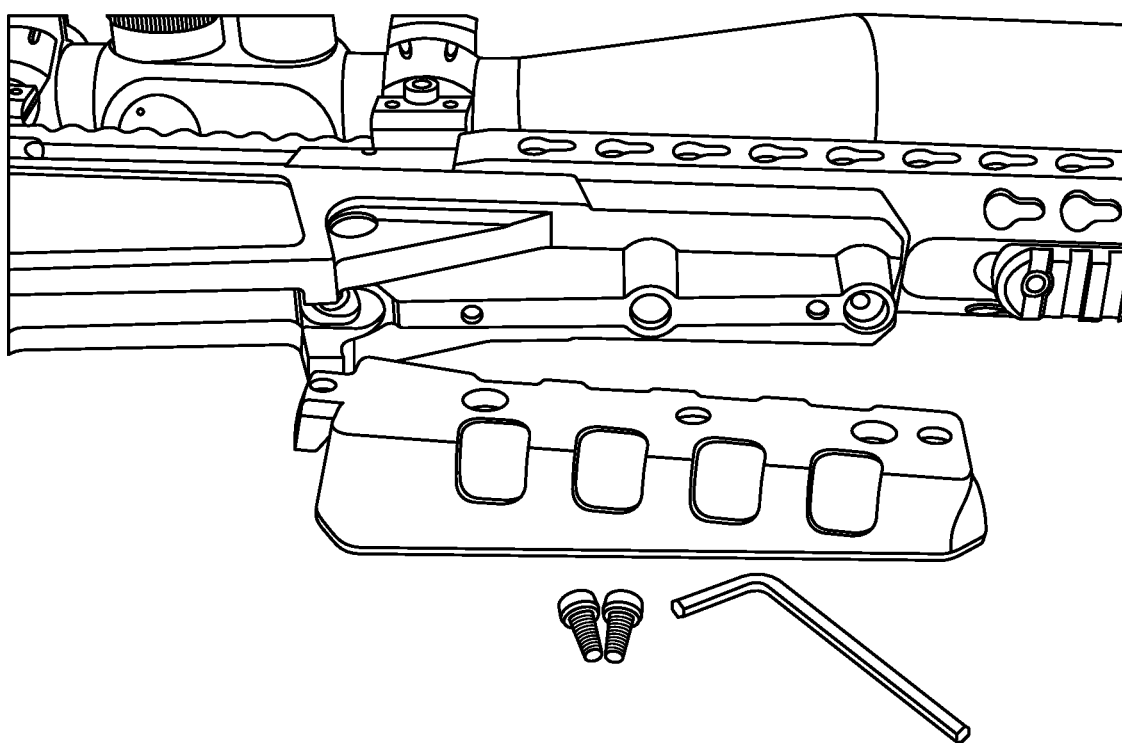
FIG. 17 is a bottom view of a rifle with a grip removed.
Figure 18:
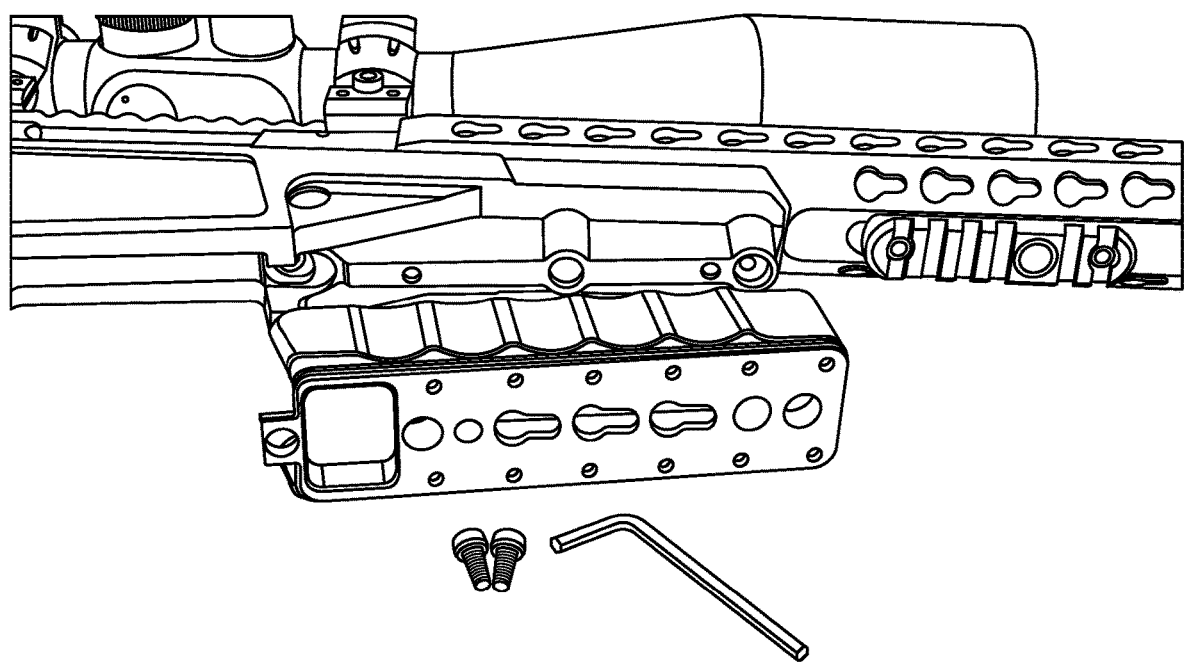
FIG. 18 is a bottom view of a rifle with a grip removed and the auxiliary plate of FIG. 3.
Figure 19:
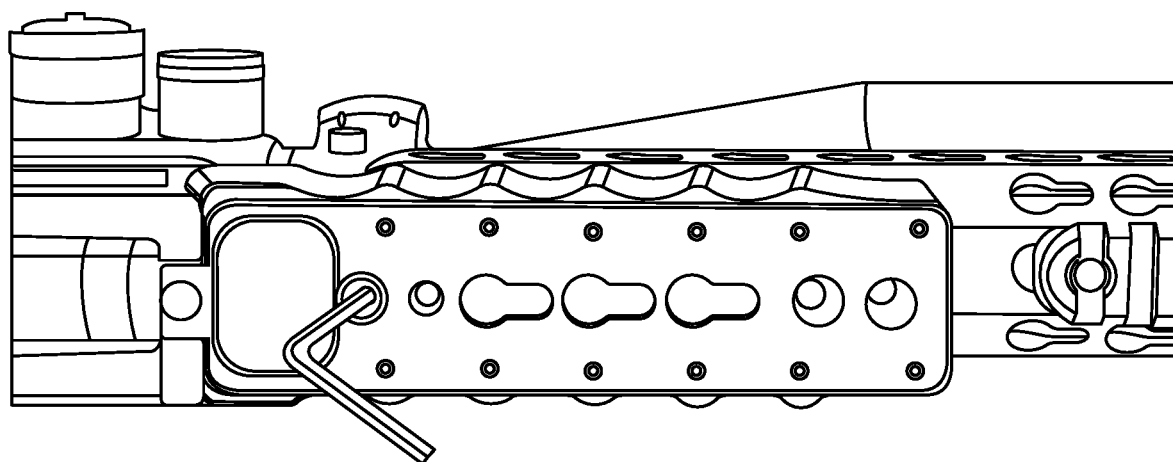
FIG. 19 is a bottom view of a rifle with a grip removed and the auxiliary plate of FIG. 3 being attached.
Figure 20:
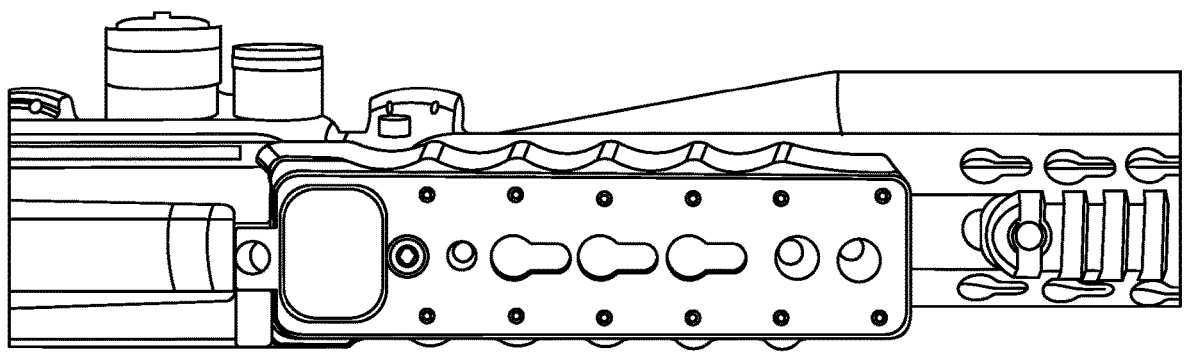
FIG. 20 is a bottom view of a rifle with a grip removed and the auxiliary plate of FIG. 3 attached thereto.

Referring to FIG. 3, a recoil management assembly 100 is preferably detachably interconnected to the support. The support preferably includes a quick release clamp 110 of any configuration or otherwise a quick release clamp of any configuration affixed to a ball head of any configuration on the top thereof. Other types of detachable connections may likewise be used, as desired. By way of example, one exemplary quick release clamp is illustrated in U.S. Pat. No. 6,773,172, incorporated by reference herein in its entirety. By way of example, one exemplary ball head is illustrated in U.S. Patent Publication No. 2006/0175482, incorporated by reference herein in its entirety. In this manner, the recoil management assembly may include a pair of dovetail slots 120 spaced apart from one another, that may be detachably engaged with the quick release clamp 110. With this detachably engaged arrangement, the recoil management assembly may be interconnected to the support in an efficient manner when in use, and detached from the support in an efficient manner when not in use. Any other engagement structure may be included on the recoil management assembly, preferably selected to be consistent with a detachable connection of a corresponding support (e.g., including a threaded screw on the support in the case that neither a quick release clamp nor a ball head is used).

Referring to FIGS. 4-20, an auxiliary body plate may be used for a rifle, such as both short and long action rifles. By way of example, the auxiliary body plate may be sized to fit an AIAX, AXMC, and/or AXAIC MkI/MkII chassis. In many implementations, the auxiliary body plate may replace a standard polymer forend grip permitting a direct and rigid chassis mount. The auxiliary body plate permits the recoil management assembly to be configured in a manner consistent with the rifle's balance point for consistent performance. The auxiliary body plate may include a pair of dovetail slots suitable for being detachably engaged with a quick release clamp of the recoil management assembly. The auxiliary body plate may include finger grooves for improved ergonomics, with the front that may be used as a barricade stop, and with the bottom being parallel with the barrel so that obstacle support is easier and enables improved articulation. The auxiliary body plate may include three keyslot attachment points on the bottom as well as an incorporated flush mount for quick detach slings. The auxiliary plate may include any configuration and may also be affixed to the rifle in any manner. The auxiliary plate may include any engagement structure for detachable interconnection to the recoil management assembly. The recoil management assembly may be directly interconnected to the rifle, omitting the auxiliary body plate, if desired.

Figure 21:
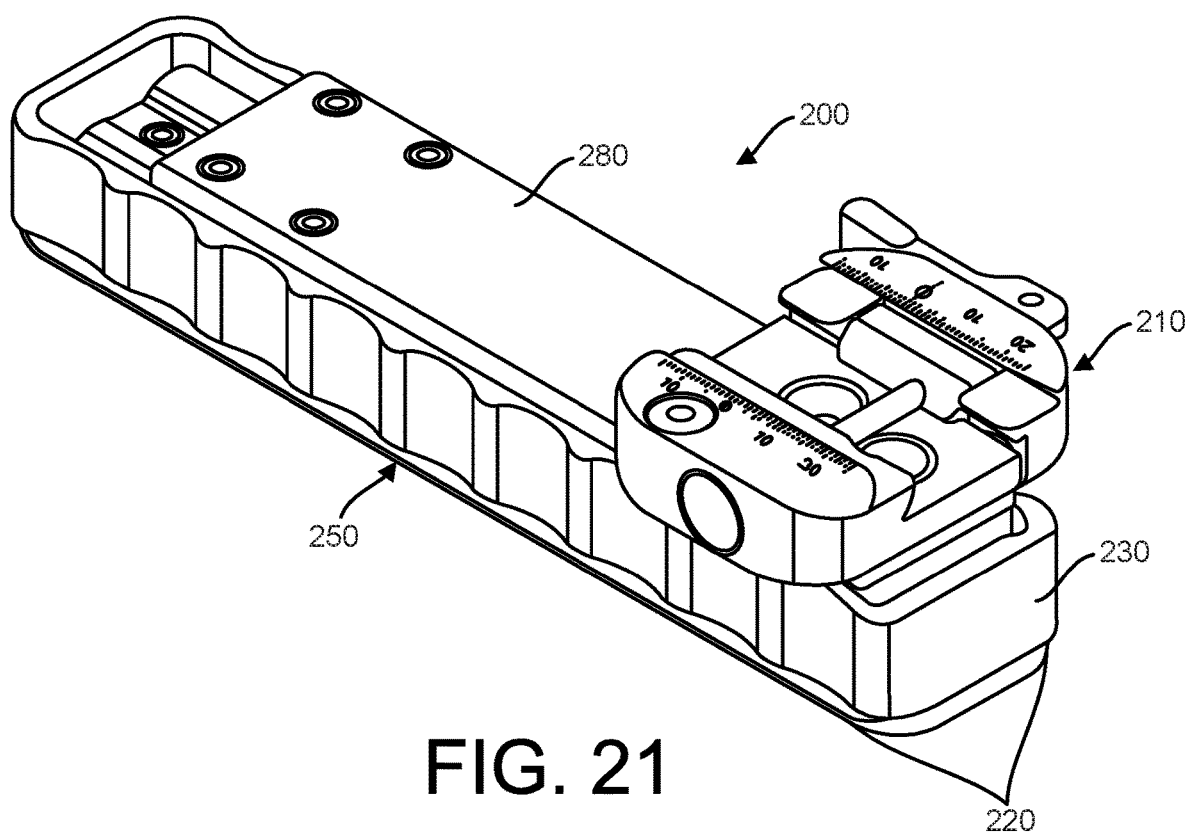
FIG. 21 illustrates an embodiment of a recoil management structure.
Figure 22:
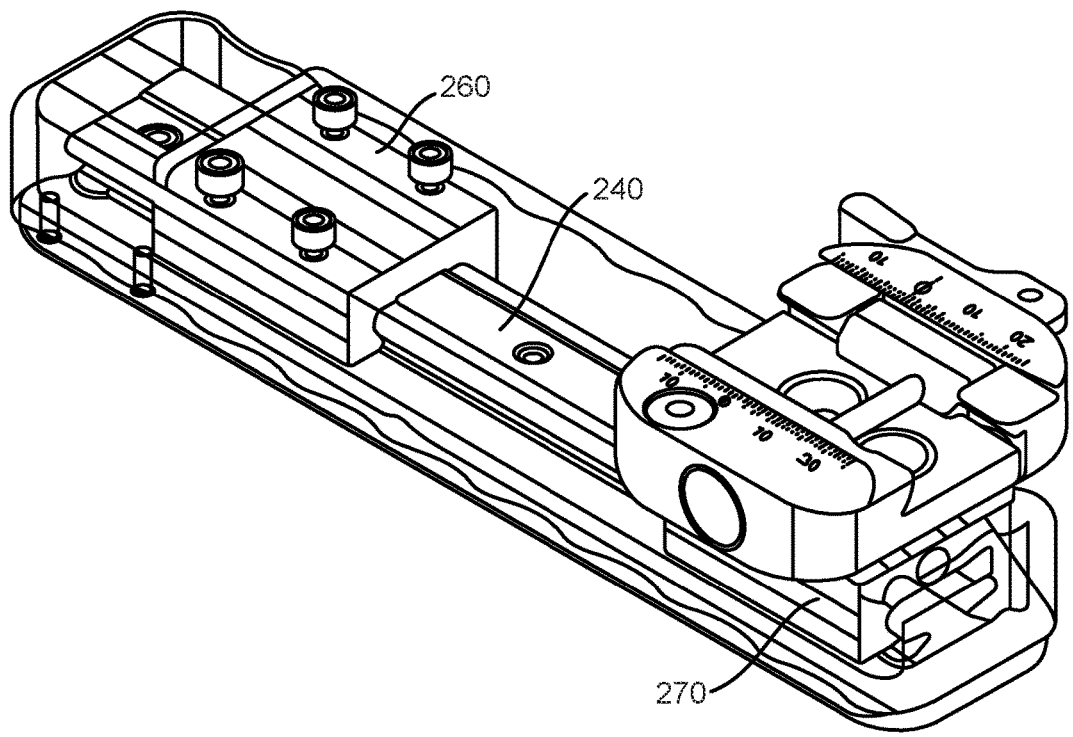
FIG. 22 illustrates the recoil management structure of FIG. 21 with portions cut away.

Referring to FIG. 21 and FIG. 22, one embodiment of the recoil management assembly 200 may include a pair of spaced apart dovetail slots 220 that are suitable to be detachably engaged with the quick release mechanism 110 supported by the tripod. The recoil management assembly 200 may include a quick release mechanism 210 that is suitable to be detachably engaged with the pair of spaced apart dovetail slots of the auxiliary plate. With this detachably engaged arrangement, the recoil management assembly may be interconnected to the auxiliary plate in an efficient manner when in use, and detached from the auxiliary plate in an efficient manner when not in use. The recoil management assembly may include any suitable structure for detachable interconnection to the tripod and/or a structure supported by the tripod. The recoil management assembly may include any suitable structure for detachable interconnection to an auxiliary plate and/or directly to a rifle.

While many recoil management systems attempt to absorb substantially all of the recoil energy from the rifle, it was determined that such an attempt to absorb substantially all of the recoil energy from the rifle is a misplaced goal. Rather than attempt to absorb substantially all of the recoil energy from the rifle it is desirable to manage the direction of the recoil energy from the rifle. The recoil management assembly preferably redirects the recoil of the rifle in a single direction. To redirect the recoil of the rifle in a single direction, the recoil management assembly permits the rifle to travel backward, parallel and in-line with the barrel and scope, while constraining its motion in all other directions and axes. By allowing the rifle to move backward as a result of shooting the rifle, the energy is directed into the shooters shoulder as normal, and the tripod is less likely to move when the energy is directed into the shooter's shoulder along a single direction. The result is that the shooter is more likely to see the impact of their bullet and more quickly be ready for a follow-up shot if needed.

Referring to FIG. 21 and FIG. 22, the recoil management assembly 200 may include a body 230 that defines the spaced apart dovetail slots 220. The body may include an internal rail 240 that extends the internal length of the body 230. The internal rail 240 is preferably affixed to the base 250 of the body 230 with a set of screws. A first slide 260 may be slidably engaged with the internal rail 240 so that it may freely slide with respect to the internal rail 240. A second slide 270 may be slidably engaged with the internal rail 240 so that it may freely slide with respect to the internal rail 240. The first slide 260 and the second slide 270 may be attached to a cover 280 using a set of screws so that they are both maintained in a spaced apart relationship. The first slide 260 and the second slide 270 being attached to the cover may be slide along a single direction, consistent with that of the internal rail 240, as a single unit while maintaining the spaced apart relationship. The quick release mechanism 210 may be attached to the cover 280 which similarly slides along a single direction, consistent with that of the internal rail 240 as a single unit together with the first slide 260 and the second slide 270.

In use, the quick release mechanism 210 together with the cover 280, attached to a rifle, supported by a tripod, would be pushed forward by the shooter to the end of its travel within the recoil management assembly 200. Upon shooting the rifle, the recoil would be constrained within a single direction along the axis of travel of the quick release mechanism 210, which is consistent with that of the internal rail 240. The recoil energy would be primarily absorbed by the shoulder of the shooter in such a manner that the tripod is unlikely to come off the ground.

Alternatively, the first slide 260 and the second slide 270 of the recoil management assembly 200 may be combined as a single slide. Alternatively, the internal rail 240 may extend a length less than the internal length of the body 230. Alternatively, the recoil management assembly 200 may include any structure that contains the recoil path of the rifle in a single direction. Alternatively, the recoil management assembly 200 may be affixed to the rifle using any structure, including directly connecting to the rifle itself. Alternatively, the recoil management assembly may be affixed to the tripod using any structure, including directly connecting to the tripod itself.

Figure 23:
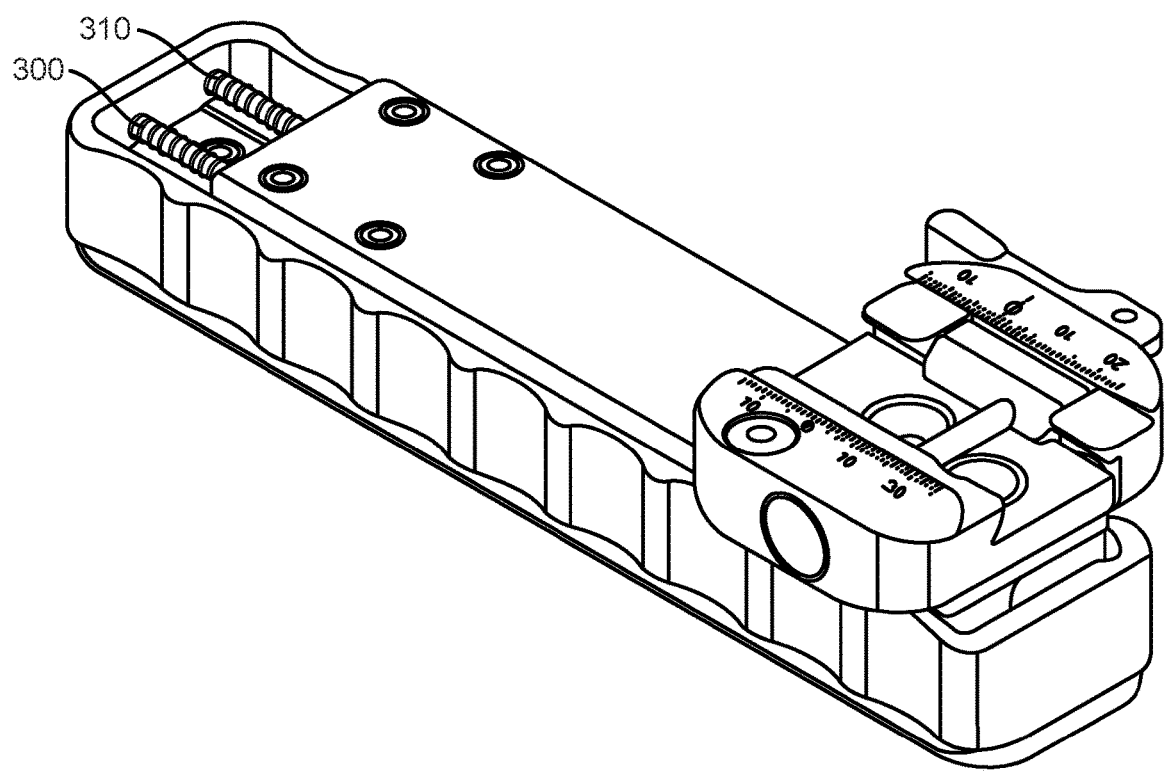
FIG. 23 illustrates another embodiment of a recoil management structure.
Figure 24:
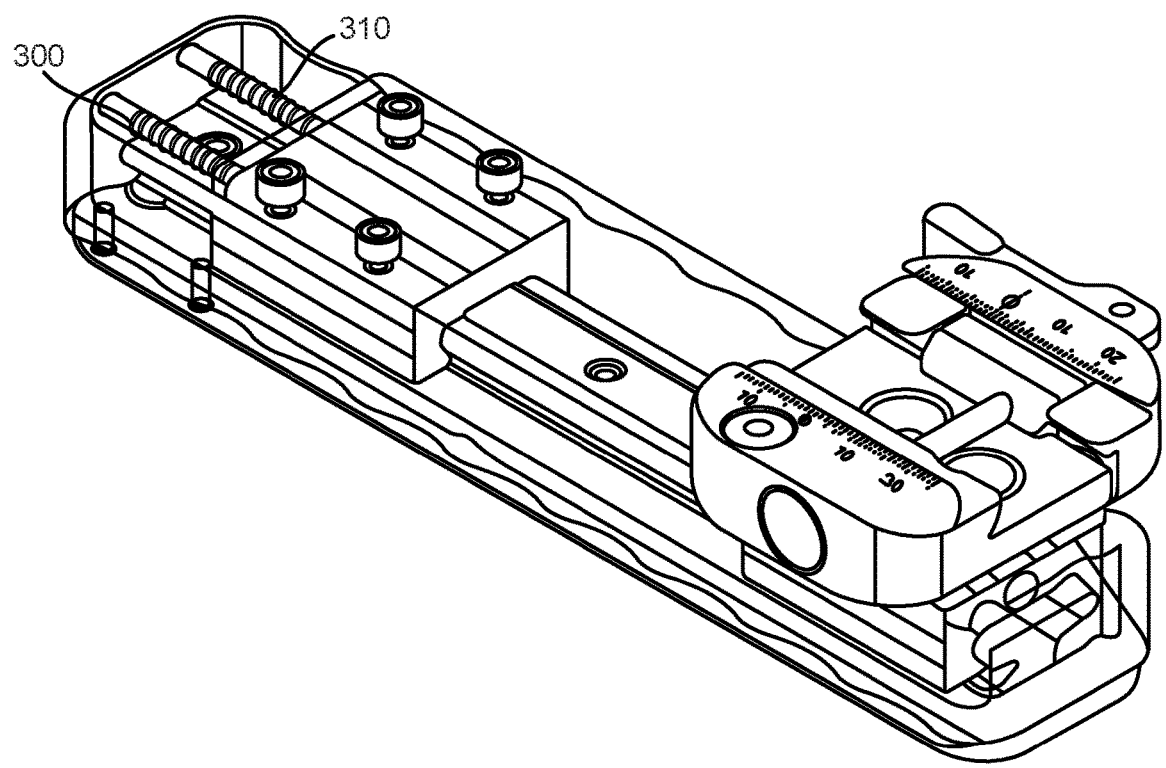
FIG. 24 illustrates the recoil management structure of FIG. 23 with portions cut away.

Referring to FIG. 23 and FIG. 24, another embodiment of the recoil management assembly may include one or more resilient members, such as one or more springs 300, 310 supported by one or more rods, operably included in front of the rifle's attachment point to allow the shooter to press their body weight into the recoil management assembly thereby depressing the one or more springs 300, 310. The resilient member may include a spring, a compressible foam, a bearing, a hydraulic fluid, a resilient band, a stretchable band, etc. The depression of the one or more springs 300, 310 reduces the likelihood of inadvertently displacing the tripod support when initially setting up for a shot and when repositioning the shoulder of the shooter while setting up for a shot. Upon shooting the rifle, the recoil is constrained along a single direction, by the recoil management assembly. The recoil likely results in the quick release mechanism 270 being pressed forward by the shooter, in which case the one or more springs 300, 310 will tend to dampen any impact on the front of the recoil management assembly. In this manner, the front operable resilient members increase the stability of the recoil management assembly, in addition to cushioning the rifle after recoil so that it doesn't slam back into the front of the device.

Figure 25:
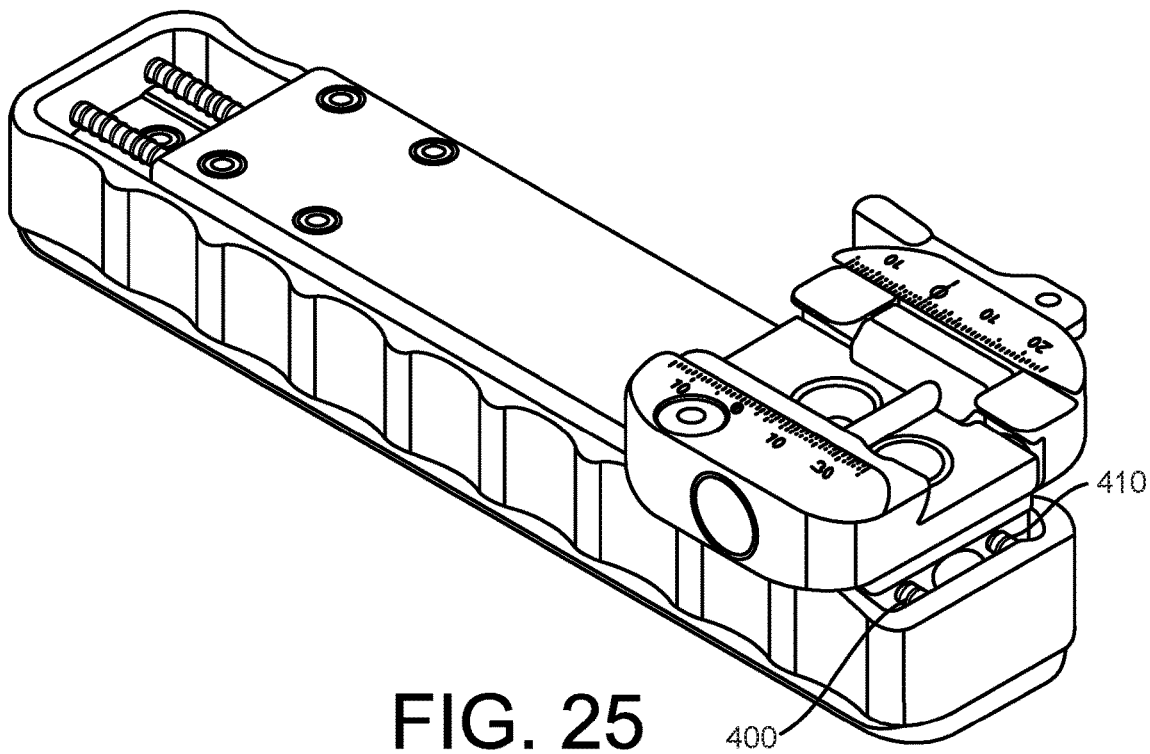
FIG. 25 illustrates another embodiment of a recoil management structure.
Figure 26:
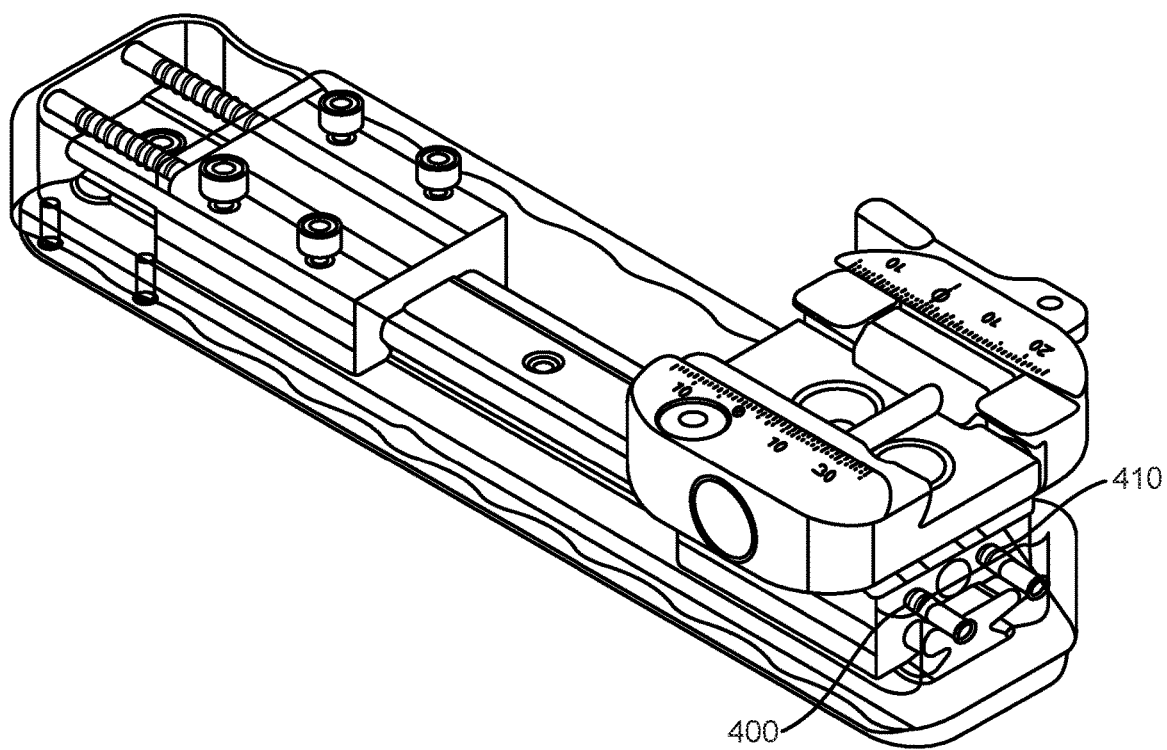
FIG. 26 illustrates the recoil management structure of FIG. 25 with portions cut away.

Referring to FIG. 25 and FIG. 26, another embodiment of the recoil management assembly may include one or more resilient members, such as one or more springs 400, 410 supported by one or more rods, operably included in the rear of the rifle's attachment point to assist in supporting the rifle in a desired position when not being held by the shooter. The resilient member may include a spring, a compressible foam, a bearing, a hydraulic fluid, a resilient band, a stretchable band, etc. This reduces the likelihood of the rifle traveling backward under its own weight and striking the rear of the recoil management assembly. Preferably, the one or more resilient members are not so stiff that it absorbs a substantial part of the recoil, so that the tripod does not lift off the ground when the rifle is fired. Upon shooting the rifle, the recoil is constrained along a single direction, by the recoil management assembly. The depression of the one or more springs 400, 410 reduces the likelihood of inadvertently displacing the tripod support when the rifle recoils after shooting. The one or more springs 400, 410 reduces the likelihood of the quick release mechanism 270 striking the rear of the recoil management assembly or otherwise tends to dampen any impact on the rear of the recoil management assembly. In this manner, the rear operable resilient members increase the stability of the recoil management assembly, in addition to cushioning the rifle after recoil so that it doesn't slam into the back of the device. The rear resilient members may be omitted, if desired.

Figure 27:
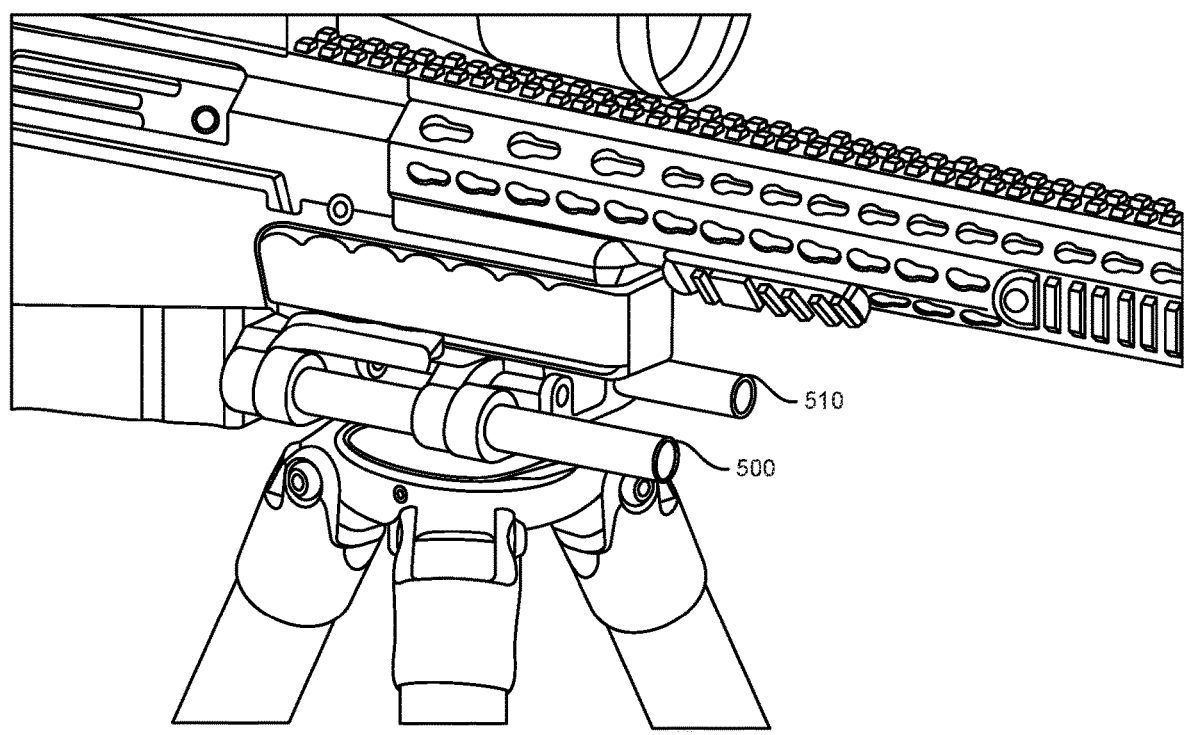
FIG. 27 illustrates another embodiment of a recoil management structure in a pre-loaded state.
Figure 28:
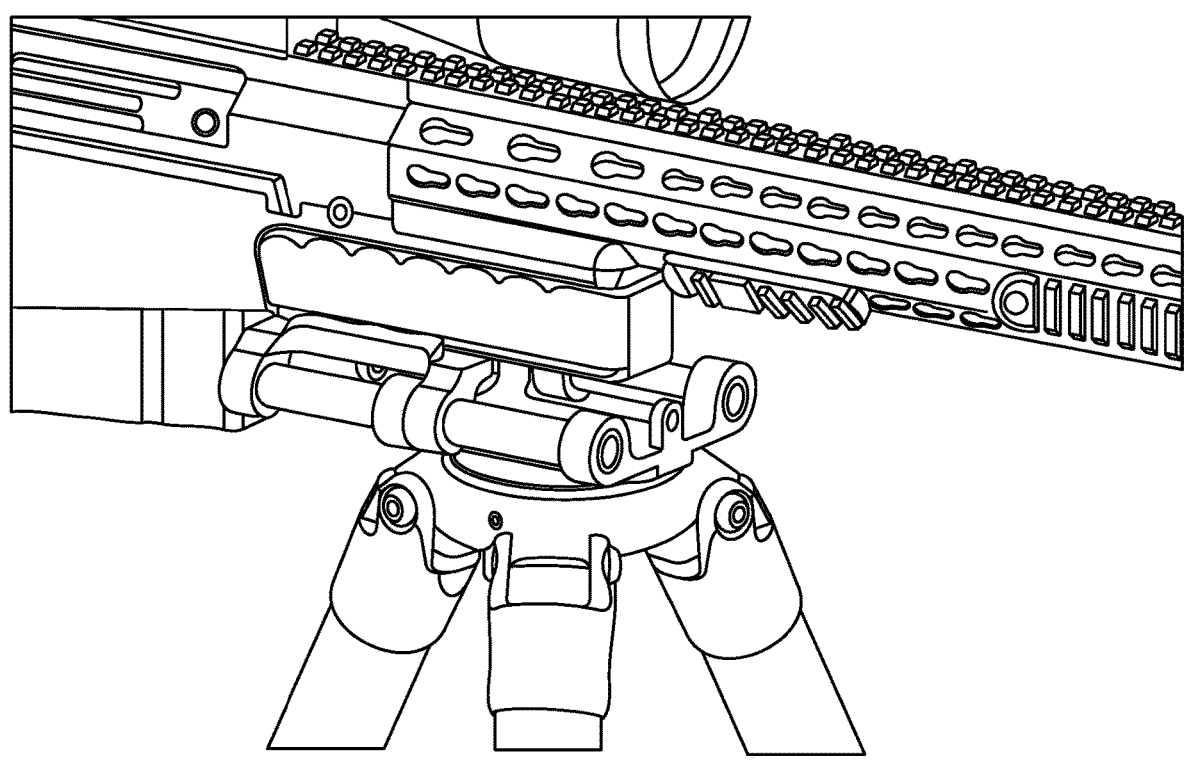
FIG. 28 illustrates another embodiment of a recoil management structure of FIG. 27 in an extended or recoiled state.
Figure 29:
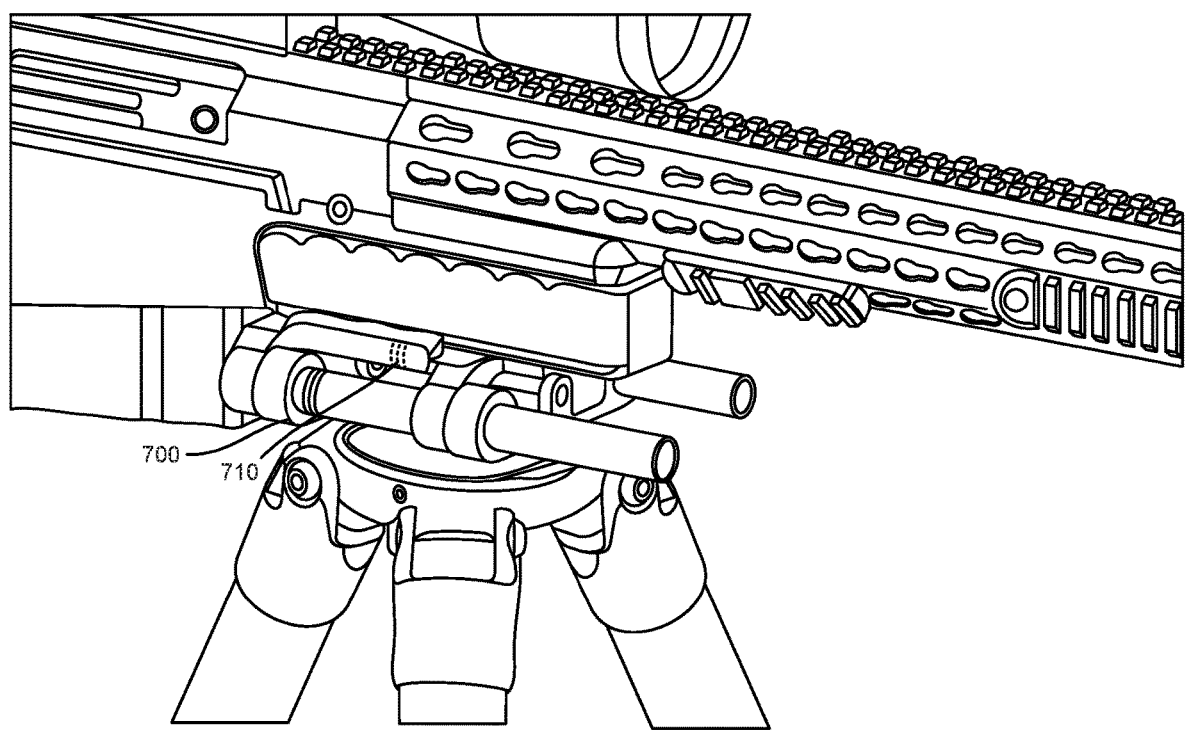
FIG. 29 illustrates another embodiment of a recoil management structure with springs in a pre-loaded state.
Figure 30:
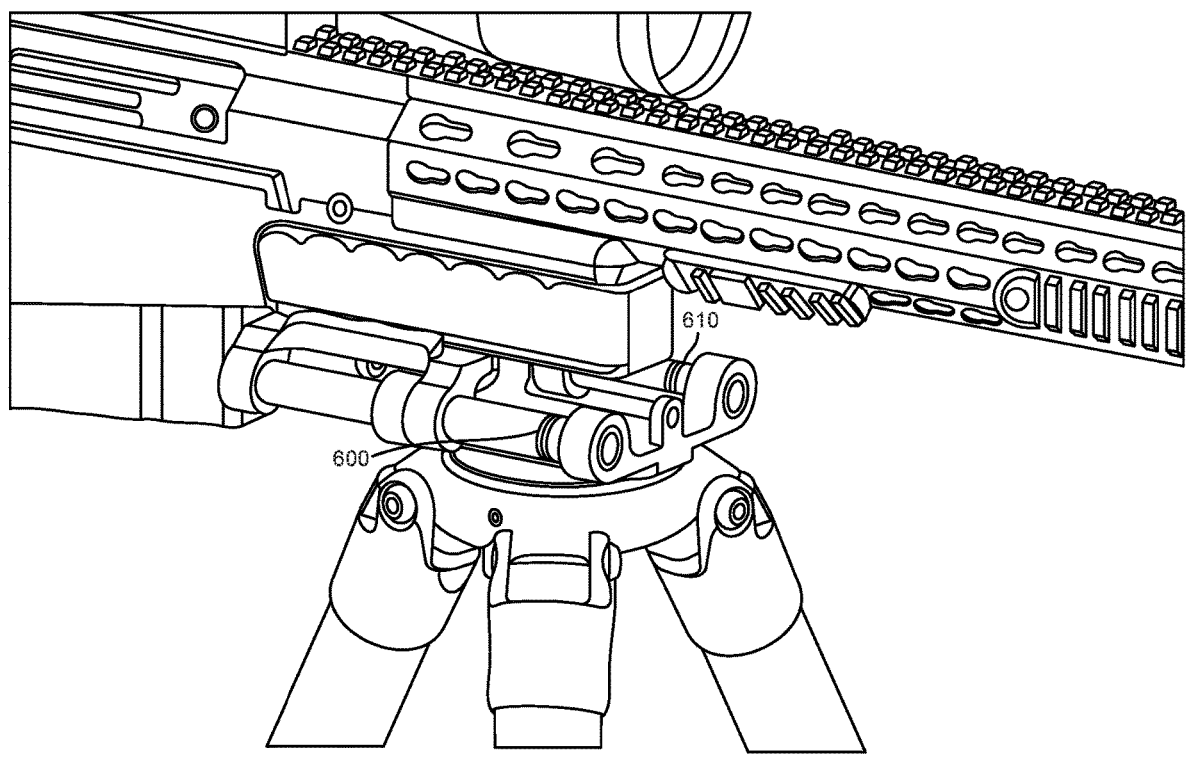
FIG. 30 illustrates another embodiment of a recoil management structure with springs of FIG. 29 in an extended or recoiled state.

Referring to FIG. 27 and FIG. 28, another embodiment of the recoil management assembly may include one or more rods 500, 510 and one or more linear motion bearings to restrict the motion of the rifle to only a single direction upon recoil. As illustrated in FIG. 28, the recoil management assembly is in its pre-loaded state. As illustrated in FIG. 28, the recoil management assembly is in an extended or recoiled state. Referring to FIG. 30, in addition, one or more springs 600, 610 (or otherwise) may be added around the rods (or otherwise) 500, 510 to dampen the front of the recoil management assembly. Referring to FIG. 29, in addition, one or more springs 700, 710 (or otherwise) may be added around the rods (or otherwise) 500, 510 to dampen the rear of the recoil management assembly. Other resilient members may likewise be used. The one or more springs reduces the likelihood of a movable portion of the assembly striking the rear of the recoil management assembly or otherwise tends to dampen any impact on the rear of the recoil management assembly. In this manner, the rear operable resilient members increase the stability of the recoil management assembly, in addition to cushioning the rifle after recoil so that it doesn't slam into the back of the device. The recoil likely results in the movable portion of the assembly striking the rear of the recoil management assembly to some extent in which case it may tend to move forward, in which case the one or more springs will tend to dampen any impact on the front of the recoil management assembly. In this manner, the front operable resilient members increase the stability of the recoil management assembly, in addition to cushioning the rifle after recoil so that it doesn't slam back into the front of the device. The front resilient members may be omitted, if desired.

Other sliding structures may likewise be used, such as roller bearings on rails, linear automation structures, plain bearings on ground guides, sleeve bearings on tubes, or otherwise. Preferably each of the sliding structures restrict the motion to a single direction, and provide a smooth, nearly frictionless, and nearly stick-slip free motion, even under substantial loads and shocks.

This recoil management assembly may be fitted with a spiked "barricade" accessory, allowing the device to be pressed against a wall, fence, tree, window sill, etc. The recoil management assembly permits the rifle to move backward and then return to its original position without this barricade accessory "hopping" and changing position.

The recoil management assembly may be built directly into the rifle chassis.

The recoil management assembly may include an adjustment to vary the resistance of the resilient members to more closely match the rifle's recoil with the amount of movement the shooter wants to feel.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A recoil management system comprising:
   (a) an elongate body that defines a pair of body dovetail slots along a pair of opposing sides suitable to be detachably engaged with a lower quick release mechanism;
   (b) an upper quick release mechanism movably supported by said elongate body such that said upper quick release mechanism is suitable to be detachably engaged with a pair of dovetail slots supported by a firearm;
   (c) a recoil suppression structure operably interconnected between said elongate body and said upper quick release mechanism constraining a recoil of said firearm aligned with said elongate body interconnected to said upper quick release mechanism in a first direction parallel and in-line with said firearm alignment while constraining said recoil of said firearm in all other directions than said first direction and axes;
   (d) further comprising an elongate rail enclosed within said elongate body;
   (e) further comprising a first slide member slidably engaged with said elongate rail.

2. The recoil management system of claim 1 wherein said first slide member slides with respect to said elongate rail in response to discharge of said firearm when said firearm is engaged with said upper quick release mechanism.

3. A recoil management system comprising:
   (a) an elongate body that defines a pair of body dovetail slots along a pair of opposing sides suitable to be detachably engaged with a lower quick release mechanism;
   (b) an upper quick release mechanism movably supported by said elongate body such that said upper quick release mechanism is suitable to be detachably engaged with a pair of dovetail slots supported by a firearm;
   (c) a recoil suppression structure operably interconnected between said elongate body and said upper quick release mechanism constraining a recoil of said firearm aligned with said elongate body interconnected to said upper quick release mechanism in a first direction parallel and in-line with said firearm alignment while constraining said recoil of said firearm in all other directions than said first direction and axes;
   (d) further comprising an elongate rail enclosed within said elongate body;
   (e) further comprising a second slide member slidably engaged with said elongate rail.

4. The recoil management system of claim 3 wherein said first slide member and said second slide member both slide with respect to said elongate rail in response to discharge of said firearm when said firearm is engaged with said upper quick release mechanism.

5. The recoil management system of claim 4 wherein said first slide member and said second slide member are both connected to a top of said elongate body, where said top of said elongate body slides with respect to said elongate rail in response to discharge of said firearm when said firearm is engaged with said upper quick release mechanism.

6. The recoil management system of claim 2 wherein said first slide member is connected to a top of said elongate body, where said top of said elongate body slides with respect to said elongate rail in response to discharge of said firearm when said firearm is engaged with said upper quick release mechanism.

7. The recoil management system of claim 3 wherein said first slide member and said second slide member are maintained in a spaced apart relationship with respect to one another by a top of said elongate body, where said top of said elongate body slides with respect to said elongate rail in response to discharge of said firearm when said firearm is engaged with said upper quick release mechanism.

8. The recoil management system of claim 3 wherein said first slide member and said second slide member are maintained in a consistent spaced apart relationship with respect to one another by a top of said elongate body while said top of said elongate body slides with respect to said elongate rail in response to discharge of said firearm when said firearm is engaged with said upper quick release mechanism.

9. The recoil management system of claim 8 wherein upper quick release mechanism maintained in a consistent spaced relationship with respect to said first slide member and said second slide member while said top of said elongate body said slides with respect to said elongate rail.

10. The recoil management system of claim 6 wherein upper quick release mechanism maintained in a consistent spaced relationship with respect to said first slide member while said top of said elongate body said slides with respect to said elongate rail.

11. A recoil management system comprising:
(a) an elongate body that defines a pair of body dovetail slots along a pair of opposing sides suitable to be detachably engaged with a lower quick release mechanism;
(b) an upper quick release mechanism movably supported by said elongate body such that said upper quick release mechanism is suitable to be detachably engaged with a pair of dovetail slots supported by a firearm;
(c) a recoil suppression structure operably interconnected between said elongate body and said upper quick release mechanism constraining a recoil of said firearm aligned with said elongate body interconnected to said upper quick release mechanism in a first direction parallel and in-line with said firearm alignment while constraining said recoil of said firearm in all other directions than said first direction and axes;
(d) wherein said recoil suppression structure operably interconnected between said elongate body and said upper quick release mechanism includes a first resilient member;
(e) wherein said recoil suppression structure operably interconnected between said elongate body and said upper quick release mechanism includes a second resilient member.

12. The recoil management system of claim 11 wherein said second resilient member is operably interconnected between said first end of said elongate body and said upper quick release mechanism.

13. The recoil management system of claim 12 wherein said second resilient member is a spring.

14. The recoil management system of claim 11 wherein said first and second resilient members are supported on respective structures laterally spaced apart from one another.

15. A recoil management system comprising:
(a) an elongate body that defines a pair of body dovetail slots along a pair of opposing sides suitable to be detachably engaged with a lower quick release mechanism;
(b) an upper quick release mechanism movably supported by said elongate body such that said upper quick release mechanism is suitable to be detachably engaged with a pair of dovetail slots supported by a firearm;
(c) a recoil suppression structure operably interconnected between said elongate body and said upper quick release mechanism constraining a recoil of said firearm aligned with said elongate body interconnected to said upper quick release mechanism in a first direction parallel and in-line with said firearm alignment while constraining said recoil of said firearm in all other directions than said first direction and axes;
(d) wherein said recoil suppression structure operably interconnected between said elongate body and said upper quick release mechanism includes a first resilient member;
(e) wherein said recoil suppression structure operably interconnected between said elongate body and said upper quick release mechanism includes a third resilient member.

16. The recoil management system of claim 15 wherein said third resilient member is operably interconnected between a second end of said elongate body and said upper quick release mechanism.

17. The recoil management system of claim 16 wherein said third resilient member is a spring.

18. The recoil management system of claim 15 wherein said recoil suppression structure operably interconnected between said elongate body and said upper quick release mechanism includes a fourth resilient member.

19. The recoil management system of claim 11 wherein said fourth resilient member is operably interconnected between said second end of said elongate body and said upper quick release mechanism.

20. The recoil management system of claim 19 wherein said fourth resilient member is a spring.

21. The recoil management system of claim 18 wherein said third and fourth resilient members are supported on respective structures laterally spaced apart from one another.

22. A recoil management system comprising:
(a) an elongate body that defines a pair of body dovetail slots along a pair of opposing sides suitable to be detachably engaged with a lower quick release mechanism;
(b) an upper quick release mechanism movably supported by said elongate body such that said upper quick release mechanism is suitable to be detachably engaged with a pair of dovetail slots supported by a firearm;
(c) a recoil suppression structure operably interconnected between said elongate body and said upper quick release mechanism constraining a recoil of said firearm aligned with said elongate body interconnected to said upper quick release mechanism in a first direction parallel and in-line with said firearm alignment while constraining said recoil of said firearm in all other directions than said first direction and axes;
(d) wherein said recoil suppression structure operably interconnected between said elongate body and said upper quick release mechanism includes a first elongate linear motion bearing;
(e) wherein said recoil suppression structure operably interconnected between said elongate body and said upper quick release mechanism includes a first resilient member associated with said first elongate linear motion bearing;

(f) wherein said recoil suppression structure operably interconnected between said elongate body and said upper quick release mechanism includes said first resilient member associated with said first elongate linear motion bearing and a second resilient member associated with said second elongate linear motion bearing to each inhibit motion in a first direction;

(g) wherein said recoil suppression structure operably interconnected between said elongate body and said upper quick release mechanism includes a third resilient member associated with said first elongate linear motion bearing and a fourth resilient member associated with said second elongate linear motion bearing to each inhibit motion in a second direction.

23. A recoil management system comprising:

(a) an elongate body that defines a pair of body dovetail slots along a pair of opposing sides suitable to be detachably engaged with a lower quick release mechanism;

(b) an upper quick release mechanism movably supported by said elongate body such that said upper quick release mechanism is suitable to be detachably engaged with a pair of dovetail slots supported by a firearm;

(c) a recoil suppression structure operably interconnected between said elongate body and said upper quick release mechanism constraining a recoil of said firearm aligned with said elongate body interconnected to said upper quick release mechanism in a first direction parallel and in-line with said firearm alignment while constraining said recoil of said firearm in all other directions than said first direction and axes;

(d) wherein said recoil suppression structure operably interconnected between said elongate body and said upper quick release mechanism includes a first elongate linear motion bearing;

(e) wherein said recoil suppression structure operably interconnected between said elongate body and said upper quick release mechanism includes a first resilient member associated with said first elongate linear motion bearing and a third resilient member associated with said first elongate linear motion bearing to each inhibit motion in opposing directions.

* * * * *